US006556921B1

(12) United States Patent
Hardage et al.

(10) Patent No.: US 6,556,921 B1
(45) Date of Patent: Apr. 29, 2003

(54) DETERMINING VERTICAL FRACTURES IN A STRATUM USING SCATTERED VERTICAL AND HORIZONTAL SHEAR MODES

(75) Inventors: Bob Hardage, Austin, TX (US); Robert J. Graebner, Dallas, TX (US)

(73) Assignee: Board of Regents for the University of Texas System, Austin, TX (US)

( * ) Notice: Subject to any disclaimer, the term of this patent is extended or adjusted under 35 U.S.C. 154(b) by 0 days.

(21) Appl. No.: 09/953,993

(22) Filed: Sep. 17, 2001

Related U.S. Application Data

(63) Continuation-in-part of application No. 09/436,453, filed on Nov. 8, 1999, now abandoned.

(51) Int. Cl.[7] .................................................. G01V 1/28
(52) U.S. Cl. ........................................... 702/14; 703/10
(58) Field of Search ............................ 702/14, 6; 367/75, 367/36; 703/5

(56) References Cited

U.S. PATENT DOCUMENTS

| | | | | |
|---|---|---|---|---|
| 4,803,666 A | * | 2/1989 | Alfprd | 367/75 |
| 5,060,204 A | * | 10/1991 | Winterstein | 367/75 |
| 5,136,554 A | * | 8/1992 | Thomsen et al. | 367/75 |
| 5,610,875 A | * | 3/1997 | Gaiser | 367/75 |
| 5,999,486 A | * | 12/1999 | DeVault | 367/36 |
| 6,292,754 B1 | * | 9/2001 | Thomsen | 702/14 |

OTHER PUBLICATIONS

B. Hardage, Vertical Seismic Processing 1983. Chapter 3 "Borehole Data Sets:Vertical Seismic Survey.". Geophysical Press and Pergamon Press, London UK.*
The Leading Edge—Special Section—Instrumented Oil Fields—"Shear Waves from 3–D–9–C Seismic Reflection Data—Have We Been Looking for Signal in all the Wrong Places?" by J. Simmons, and M. Backus; The Society of Exploration Geophysics; pp. 604–612; Jun. 2001.
Thesis by Bryan DeVault; Dec. 5, 2001; 110 pages.

* cited by examiner

Primary Examiner—Edward Lefkowitz
Assistant Examiner—Victor J. Taylor
(74) Attorney, Agent, or Firm—Hitt Gaines & Boisbrun, PC

(57) ABSTRACT

The present invention provides a system for, and method of determining vertical fractures in a stratum using scattered horizontal shear and vertical shear modes. The method may include segregating first order horizontal and vertical shear modes of a seismic energy wave into second order horizontal and vertical shear modes, defining a seismic energy wave corridor along a radial path between a seismic energy source and seismic receivers, and gathering seismic data received by the seismic receivers within the corridor, the data including the second order horizontal and vertical shear modes.

27 Claims, 15 Drawing Sheets

DETERMINING VERTICAL FRACTURES IN A STRATUM USING SCATTERED VERTICAL AND HORIZONTAL SHEAR MODES

CROSS-REFERENCE TO RELATED APPLICATION

This application is a continuation-in-part of U.S. patent application Ser. No. 09/436,453, filed on Nov. 8, 1999, now abanboned entitled "METHOD OF SEISMIC EXPLORATION DISCRIMINATING HORIZONTAL AND VERTICAL SHEAR WAVES" to Milo Backus, et al., which is incorporated herein by reference.

TECHNICAL FIELD OF THE INVENTION

The present invention is directed, in general, to geophysical exploration and, more specifically, to a system and method for determining vertical fractures in a stratum using scattered vertical and horizontal shear modes.

BACKGROUND OF THE INVENTION

Most geophysical techniques currently dealing with multi-dimensional seismic data do not discriminate between seismic energies of different orientations, such as the compressional energy or vertical and horizontal shear energies of reflected seismic data systems. In a typical multi-dimensional seismic survey, a multi-mode seismic energy generator may be used to generate a preponderance of one orientation of seismic energy relative to a particular orientation. Then a preponderance of energies orthogonal to the first but relative to the same orientation may also be generated. However, the orientation of the received seismic energy changes at each receiver station due to a difference in orientation between the seismic energy source and each receiver in a multi-dimensional seismic array.

Differently oriented seismic energies may also propagate differently through the subsurface strata based upon the characteristics of the subsurface strata. Anisotropies in the subsurface strata also impact the seismic energies of different orientations, especially shear wave energy. Anisotropic subsurface parameters may be found in the form of thin-bed strata, laminae and bed matrix grains or pores that have a preferential direction caused by deposition or tectonic stress. Another common form of anisotropic subsurface properties are subsurface fractures. Anisotropies cause subsurface parameters such as permeability, shear strength and seismic velocities to have different values in different directions.

Compressional energy waves may generate vertical shear energy waves at subsurface interfaces. Additionally, vertical and horizontal shear waves may acquire significant second-order properties in areas containing subsurface anisotropies that complicate the problem of intermingling but also offer opportunity for analysis if the energies could be segregated. However, the processing of such data is complicated due to the intermingling and therefore not easily discriminated into the differently oriented energies for each source-receiver azimuth. Also, the processing of these components is further complicated since the orientation of the operational modes of the seismic energy source do not generally correspond to the orientation of each receiver in the geophysical data acquisition array.

The mapping of subsurface features may be greatly enhanced by processing the differently oriented seismic energies in a way that accommodates their different attributes. This is especially true in an orientation specific to the azimuths defined by each seismic energy source and receiver pair. Additionally, important rock property information could be ascertained by comparing differences and similarities of the attributes of the appropriately oriented seismic energies.

Accordingly, what is needed in the art is a way to more effectively segregate and differentiate subsurface anisotropic situations, such as vertical fractures, in seismic surveying situations.

SUMMARY OF THE INVENTION

To address the above-discussed deficiencies of the prior art, the present invention provides a system for, and method of determining vertical fractures in a stratum using scattered horizontal shear and vertical shear modes. In one embodiment, the method includes segregating first order horizontal and vertical shear modes of a seismic energy wave into second order horizontal and vertical shear modes, determining a seismic energy wave corridor along a radial path between the seismic energy source and the seismic receiver, and gathering seismic data received by the seismic receivers within the corridor wherein the data includes horizontal and vertical shear components.

In another embodiment, segregating includes transforming seismic energy wave generated by a seismic energy source and received by a seismic receiver into radial/transverse coordinate space. In such embodiments, transforming may include orienting a first seismic receiver with a seismic energy source along a radial path between the first seismic receiver and the seismic energy source to obtain a vertical shear component, and aligning a second seismic receiver substantially transverse to the radial path to obtain a horizontal shear component.

In this particular embodiment, the first and second seismic energy receivers may be substantially orthogonal with respect to each other and transforming further includes orienting first and second seismic energy receivers such that the first seismic energy receiver is aligned substantially perpendicular to a reflected seismic energy wave having an angle of emergence to thereby maximize the vertical shear energy received by the first seismic energy receiver and the second seismic energy receiver is aligned substantially horizontal with the angle of emergence.

In another aspect of this particular embodiment, the seismic energy receiver further includes a third seismic energy receiver substantially orthogonal to the first and second seismic energy receivers and orienting first and second seismic energy receivers includes aligning the third seismic energy receiver with the reflected seismic energy wave.

In yet another embodiment transforming seismic energy includes transforming waves generated by a seismic energy source and received by a plurality of seismic receivers within the corridor into radial/transverse coordinate space. In such embodiments, gathering may include summing data received by the plurality of seismic receivers and dividing the plurality of seismic receivers into stacking bins. In another embodiment, determining includes determining an azimuth of the corridor with respect to the seismic energy source and a width of the corridor.

The present invention also provides, in another embodiment a system for determining anisotropy in a stratum using scattered horizontal shear and vertical shear modes. In an advantageous embodiment, the system includes a seismic energy source, a reflected seismic energy wave reflected from a subsurface interface and having horizontal shear energy and vertical shear energy associated therewith, first and second seismic energy receivers, wherein the first seismic energy receiver is aligned radially with the seismic energy source and wherein the second seismic energy receiver is aligned substantially transverse with the seismic energy source, a seismic energy wave corridor extending along a radial path between the seismic energy source and the first seismic energy receiver, seismic data received by the first and second seismic receivers within the corridor wherein the data includes first order vertical and horizontal shear modes that have been segregated into second order vertical and horizontal shear modes.

In another aspect, the present invention provides a method of exploring a subterranean feature with seismic energy. In one exemplary embodiment, the method includes generating a seismic energy wave toward a subterranean feature, reflecting the seismic energy from the subterranean feature to produce a reflected seismic energy wave having vertical and horizontal shear energy associated therewith, segregating first order horizontal and vertical shear modes of a seismic energy wave into second order horizontal and vertical shear modes, determining a seismic energy wave corridor along a radial path between the seismic energy source and the seismic receiver, gathering seismic data received by the seismic receivers within the corridor.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
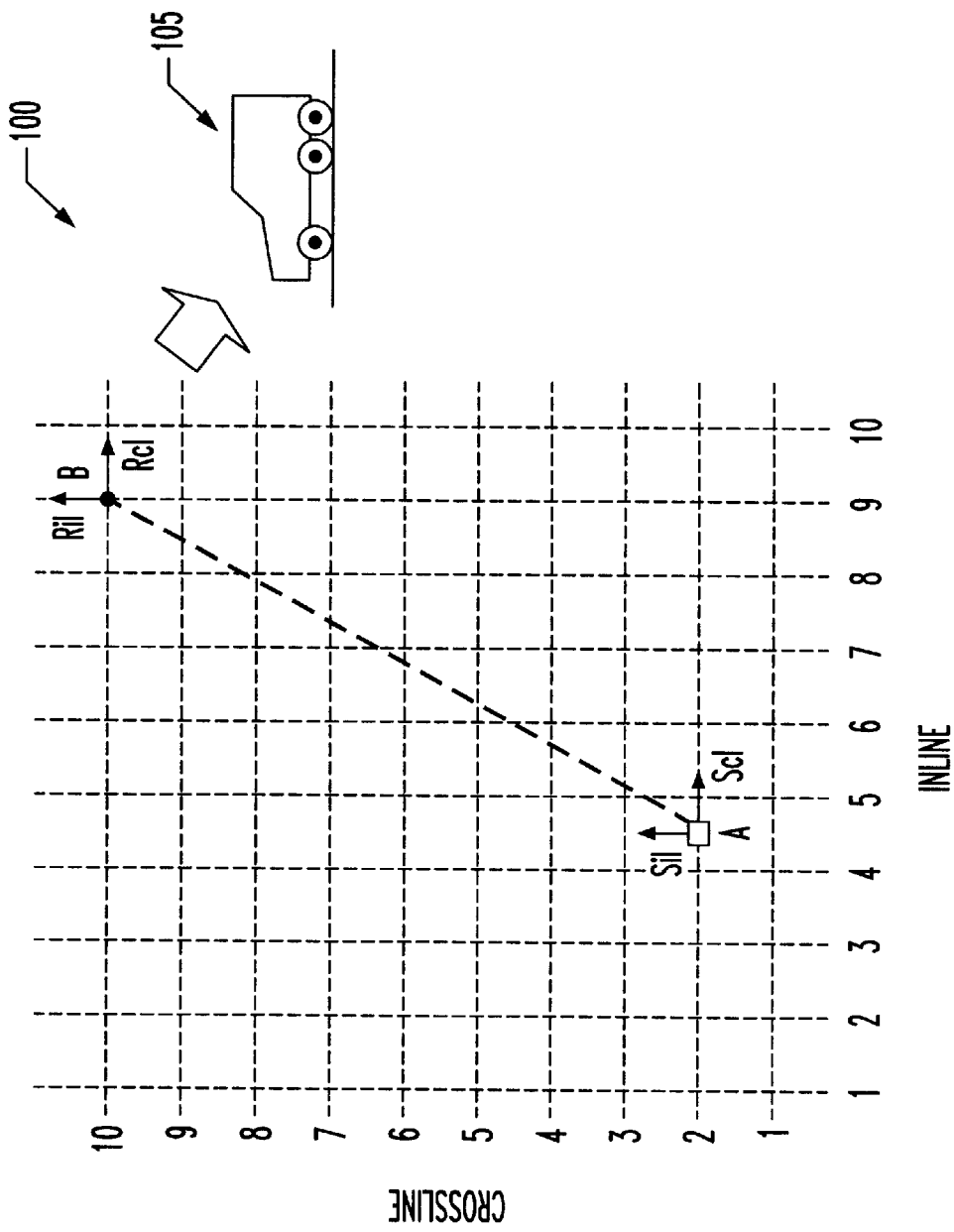
FIG. 1 illustrates a plan view of a volumetric or three dimensional (3-D) seismic survey system.

Referring initially to FIG. 1, illustrated is a plan view of a volumetric or three dimensional (3-D) seismic survey system 100. The seismic survey system 100 includes essentially orthogonal first and second seismic energy sources Sil, Scl located at a source station A and essentially orthogonal first and second seismic energy receivers Ril, Rcl located at a receiver station B. The seismic survey system 100 also includes a recording vehicle 105 employing a computer, which captures and records seismic data received by the first and second seismic energy receivers Ril, Rcl. The computer may also employ algorithms to manipulate the seismic data. As shown in FIG. 1, both source and receiver stations A, B are positioned with respect to essentially orthogonal inline and crossline locations collectively designated INLINE 1-10 and CROSSLINE 1-10. This orientation is commonly called field coordinate space.

In the illustrated embodiment, the source station A is located on a CROSSLINE 2 and positioned midway between an INLINE 4 and an INLINE 5. The receiver station B is located at the intersection of an INLINE 9 and a CROSSLINE 10. These are arbitrary locations and of course, receivers at more than one receiver station may be arrayed about the source station A (typically at inline-crossline intersections) to receive and record additional reflected seismic energy in a volumetric seismic survey. The first seismic energy source Sil is an inline-polarized horizontal source, and the second seismic energy source Scl is a crossline-polarized horizontal source. Similarly, the first seismic energy receiver Ril is an inline horizontal sensor, and the second seismic energy receiver Rcl is a crossline horizontal sensor. Although not specifically detailed in FIG. 1, source station A and receiver station B also include a vertical seismic energy source Sv and a vertical seismic energy receiver Rv, respectively.

In the seismic survey system 100, the seismic energy imparted at the source station A into the subsurface formations of the earth contains seismic energy modes of various orientations. Generally, these oriented seismic energies contain vertical shear waves, horizontal shear waves, and compression waves. In the field coordinate orientation of FIG. 1, the first and second seismic energy receivers Ril, Rcl receive energies from each of these three modes or orientations that are intermingled together in a way that complicates data processing and imaging.

Figure 2:
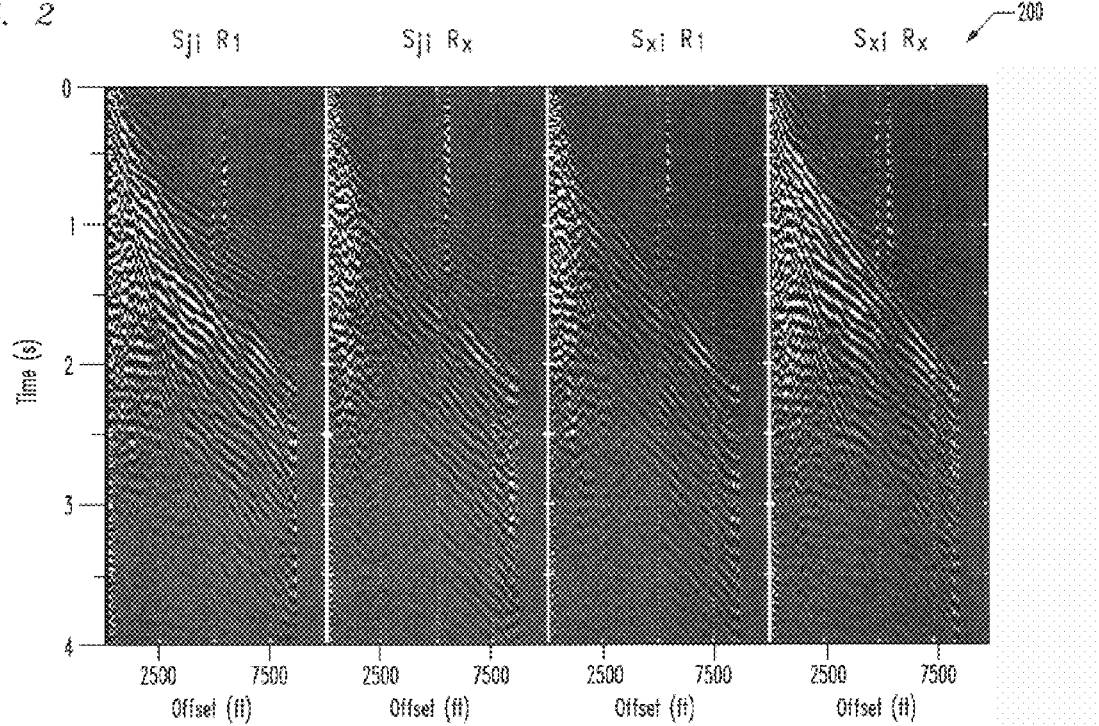
FIG. 2 illustrates a time/offset survey data plot using multiple nine-component, three-dimensional (9C3D) source-receiver stations having an inline and crossline orientation (field coordinate space), as shown in FIG. 1.

Turning now to FIG. 2, illustrated is a time/offset survey data plot 200 using multiple nine-component, three-dimensional (9C3D) source-receiver stations having an inline and crossline orientation (field coordinate space), as shown in FIG. 1. The time/offset survey data plot 200 utilizes four source-receiver data sets including a first data set Si;Ri, a second data set Si;Rx, a third data set Sx;Ri and a fourth data set Sx;Rx. The first data set Si;Ri uses data generated by inline seismic energy sources and received by inline seismic energy receivers. The second data set Si;Rx uses data generated by inline seismic energy sources and received by crossline seismic energy receivers. The third data set Sx;Ri uses data generated by crossline seismic energy sources and received by inline seismic energy receivers. The fourth data set Sx;Rx uses data generated by crossline seismic energy sources and received by crossline seismic energy receivers.

The time/offset survey data plot 200 consists of super gathers of prestack data, which are first sorted into 100 foot offset bins where each offset bin is then stacked to produce a mean stack. Compressional wave energy is apparent in both the first and fourth data sets Si;Ri, Sx;Rx preceding the first arrival of the shear wave, although the compressional wave energy is somewhat stronger on the first data set Si;Ri. Because the recording template is neither exactly square or uniformly sampled with source stations, the first data set Si;Ri contains slightly more vertical shear energy, and the fourth data set Sx;Rx contains slightly more horizontal shear energy. A difference may be observed in the behavior of the surface waves between the first and fourth data sets Si;Ri, Sx;Rx.

It may also be observed that the crossterm second and third data sets Si;Rx, Sx;Ri are very similar. The energy in the crossterm second and third data sets Si;Rx, Sx;Ri is not related to azimuthal anisotropy, as is often interpreted, but is related to the acquisition geometry of the data. This is the principal reason why efforts to use wavefield splitting concepts to minimize crossterm energy for 9C3D data and to determine an anisotropy or its orientation axes in field coordinate space is fundamentally flawed.

Figure 3:
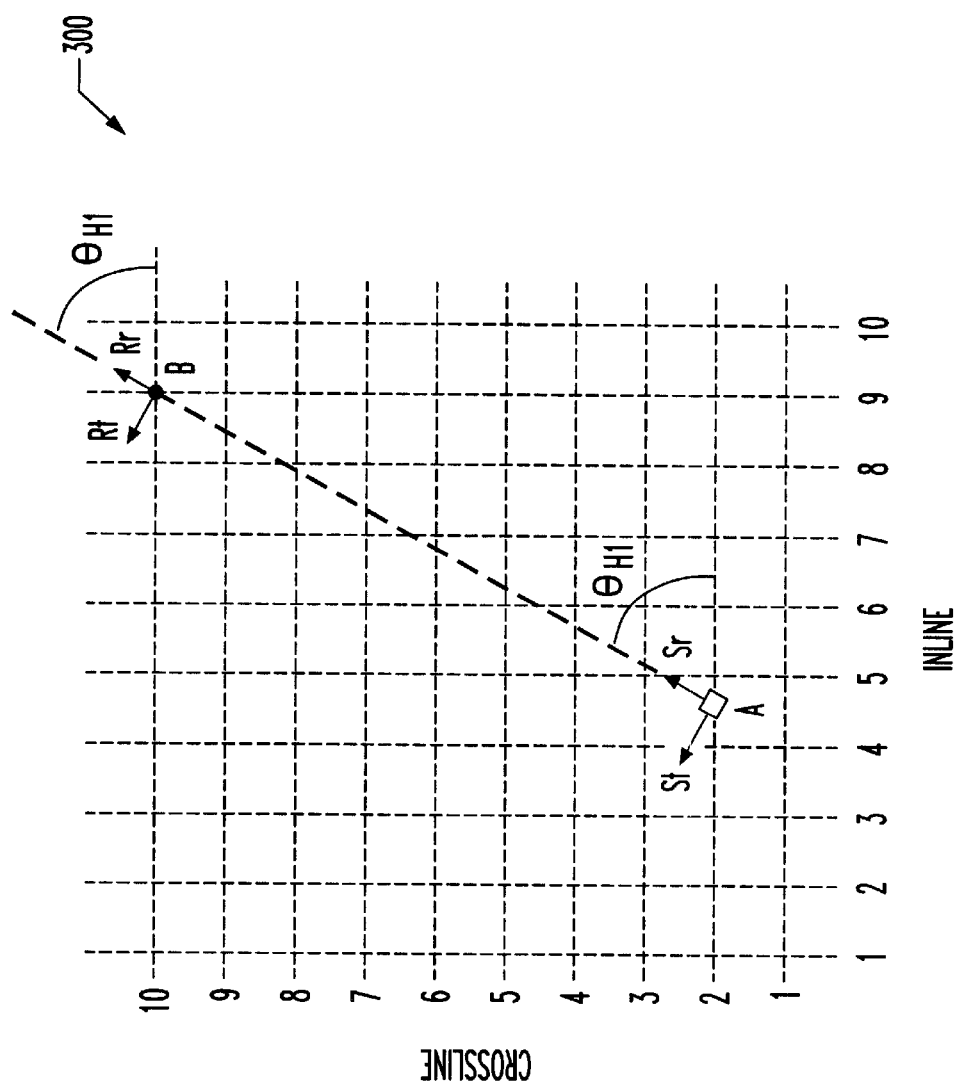
FIG. 3 illustrates a plan view of an embodiment of a seismic survey system showing a transformation in the horizontal plane of the seismic survey system of FIG. 1.

Turning now to FIG. 3, illustrated is a plan view of a seismic survey system 300 showing a transformation in the horizontal plane of the seismic survey system 100 of FIG. 1. The seismic survey system 300 includes essentially orthogonal first and second seismic energy sources Sr, St located at a source station A and essentially orthogonal first and second seismic energy receivers Rr, Rt located at a receiver station B. As shown in FIG. 3, both source and receiver stations A, B are still positioned with respect to essentially orthogonal inline and crossline locations collectively designated INLINE 1-10 and CROSSLINE 1-10, as before. However, the seismic survey system 300 employs a unique coordinate rotation to transform the horizontal sources and receivers from the inline and crossline orientation (field coordinate space) of FIG. 1 to a radial and transverse orientation (radial/transverse coordinate space), as shown in FIG. 3.

This coordinate change employs a trigonometric rotation of both the sources and receivers as defined by an azimuth angle $\Theta_{HI}$. The azimuth angle $\Theta_{HI}$ is defined as the angle between the crossline direction and a straight line formed through the source-receiver station pair A-B, as shown in FIG. 3. This coordinate change is typically accomplished through manipulation and processing of the recorded seismic data, preferably with computers and the appropriate software to accomplish the data manipulation. One who is skilled in the art would be understand how to program the computer to make the appropriate data manipulations using the trigonometric function mentioned above. However, this coordinate change may also be accomplished by physically orienting the sources and receivers as shown in FIG. 3.

This rotation is critical for separating wave modes in a 3-D multi-component seismic data acquisition geometry. This coordinate rotation transforms the seismic data to allow the first receiver Rr and the first seismic energy source Sr, which are oriented in the radial direction, to effectively provide a wavefield that is dominated by compression and vertical shear modes. This arrangement minimizes interference from horizontal shear modes. Correspondingly, the rotation also transforms the seismic data to allow the second seismic energy receiver Rt and the second seismic energy source St, which are oriented in the transverse direction, to effectively provide a wavefield that is dominated by horizontal shear reflections having minimal interfering compression and vertical shear modes. This allows further data processing steps to proceed in a more robust manner.

Figure 4:
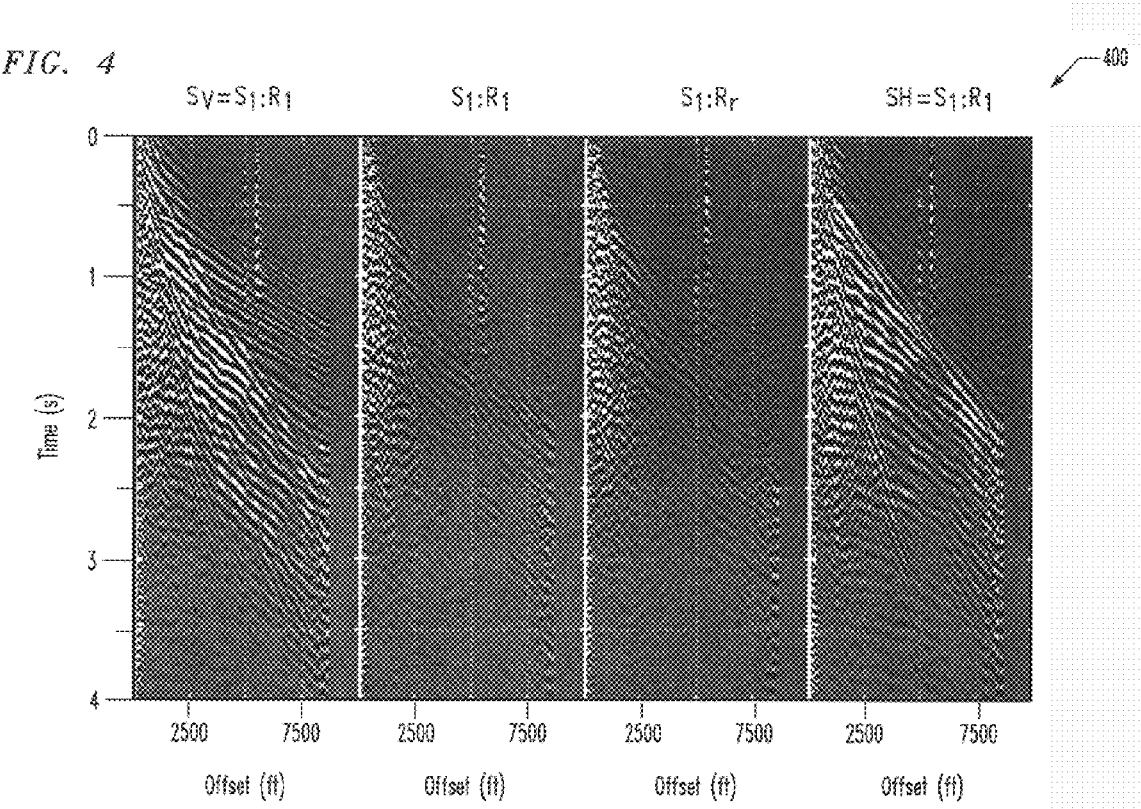
FIG. 4 illustrates a time/offset survey data plot using multiple nine-component, three-dimensional (9C3D) source-receiver stations having a radial and transverse orientation (radial/transverse coordinate space), as shown in FIG. 3.

Turning now to FIG. 4, illustrated is a time/offset survey data plot 400 using multiple nine-component, three-dimensional (9C3D) source-receiver stations having a radial and transverse orientation (radial/transverse coordinate space), as shown in FIG. 3. The time/offset survey data plot 400 utilizes four source-receiver data sets including a first data set Sr;Rr, a second data set Sr;Rt, a third data set St;Rr and a fourth data set St;Rt. The first data set Sr;Rr uses data generated by radial seismic energy sources and received by radial seismic energy receivers. The second data set Sr;Rt uses data generated by radial seismic energy sources and received by transverse seismic energy receivers. The third data set St;Rr uses data generated by transverse seismic energy sources and received by radial seismic energy receivers. The fourth data set St;Rt uses data generated by transverse seismic energy sources and received by transverse seismic energy receivers.

The time/offset survey data plot 400 consists of super gathers of prestack data similar to the time/offset survey data plot 200 shown in FIG. 2. However, the super gathers of FIG. 4 are done in the radial and transverse orientation thereby enhancing vertical shear energy in the first data set Sr;Rr and horizontal shear energy in the fourth data set St;Rt. Compressional wave energy has been rotated into the radial coordinate data. Surface waves may be seen to be more coherent than in field coordinates. Rayleigh waves on the vertical shear energy and Love waves on the horizontal shear energy may also be seen in FIG. 4. Shear wave reflections are more visible in the horizontal shear data at offsets outside the surface wave noise cone.

The signal-to-noise ratio on first arrivals of the shear waves is higher on the horizontal shear data. The head wave of the horizontal shear energy may be seen easily at offset-time coordinates of 2,500 feet and 0.7 seconds, 5,000 feet and 1.4 seconds and 7,500 feet and 1.9 seconds. The apparent head wave of the vertical shear energy may be seen at offset-time coordinates of 2,500 feet and 0.8 seconds, 5,000 feet and 1.6 seconds and 7,500 feet and 2.4 seconds. A difference in the first-arrival times of the head waves for vertical and horizontal shear energies also may be noted. This difference is an indication that vertical transverse isotropy (layering) is important in the surveyed area. The vertical shear wave velocity is 25 percent slower than the horizontal shear wave velocity. This is a normal, first-order condition that occurs even in subsurface mediums or environments that are transversely isotropic. The ability to observe this attribute of shear wave energy is a critical first step to accurately detecting areas of anisotrophy, such as thin bedded strata, laminae and even elongated matrix grains (or pores) that are oriented in a preferential direction by deposition or tectonic stress.

Figure 5:
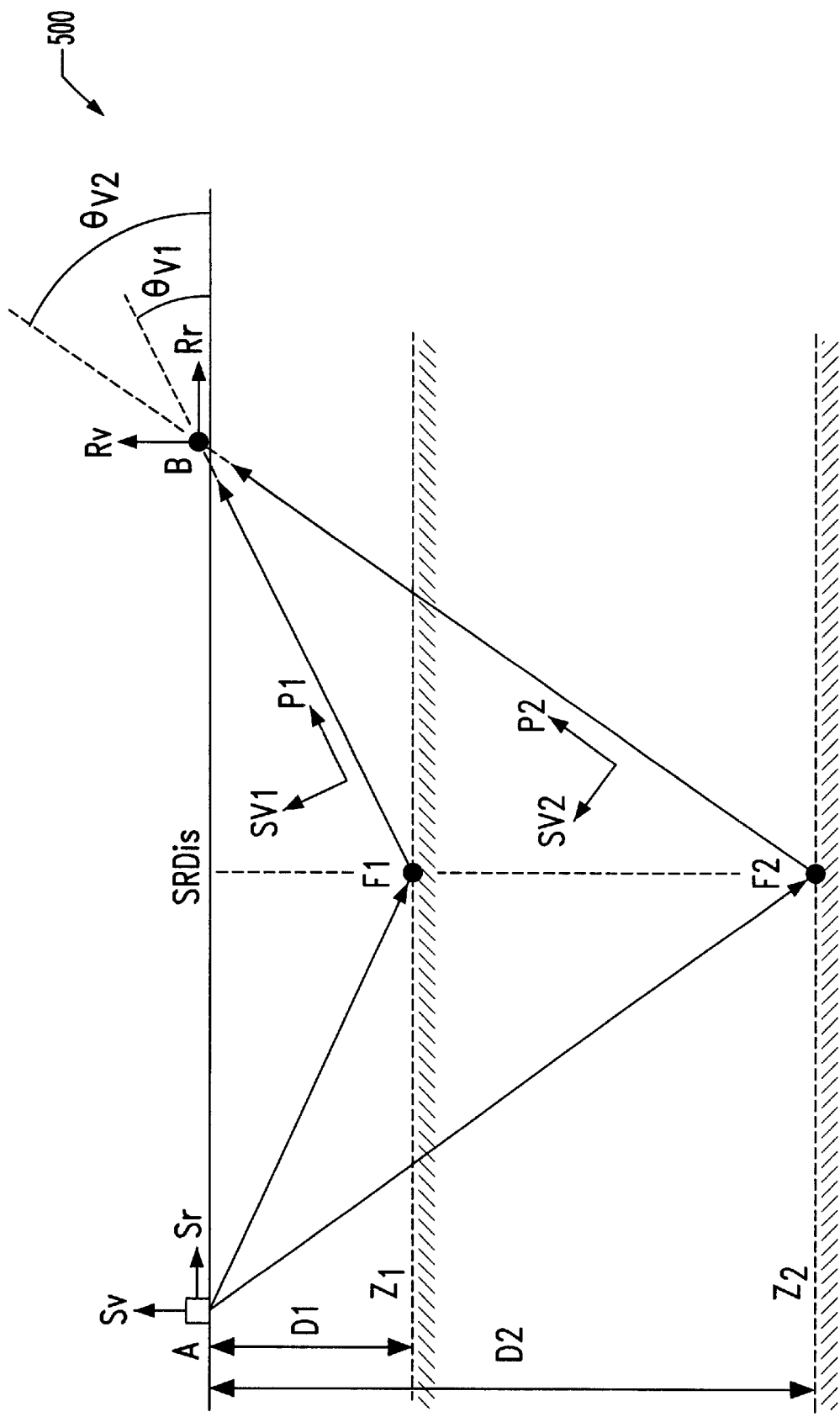
FIG. 5 illustrates a vertically sectioned plane view of an embodiment of a seismic survey system taken along the straight line formed through the source-receiver station pair of FIG. 3.

Turning now to FIG. 5, illustrated is a vertically sectioned plane view of a seismic survey system 500 taken along the straight line formed through the source-receiver station pair A-B of FIG. 3. The seismic survey system 500 includes a surface receiver station B having a radial seismic energy receiver Rr oriented along the path of the source-receiver station pair A-B and a substantially orthogonal vertical seismic energy receiver Rv. Although not specifically detailed in FIG. 5, the receiver station B also includes a transverse seismic energy receiver Rt, as was shown in FIG. 3. The seismic survey system 500 also includes a first subsurface interface $Z_1$ located at a first depth D1 having a first subterranean feature F1 and a second subsurface interface $Z_2$ located at a second depth D2 having a second subterranean feature F2. The embodiment of FIG. 5 displays a radial and vertical coordinate orientation (radial/vertical space).

The seismic survey system 500 further includes a source station A, located on the surface, having a radial seismic energy source Sr, a vertical seismic energy source Sv and a transverse seismic energy source St (not shown), as before. The source station A is located at a source-receiver distance SRDis from the receiver station B. The seismic energy sources located at the source station A generate seismic energy along a first wavepath A-F1-B that provides a first reflected seismic energy wave F1-B and along a second wavepath A-F2-B that provides a second reflected seismic energy wave F2-B, as shown. In the illustrated embodiment, the first and second reflected seismic energy waves F1-B, F2-B have first and second angles of emergence $\Theta_{V3}$, $\Theta_{V2}$, as seen in FIG. 5. Generally, an angle of emergence may be defined as the angle between a path of a reflected seismic energy wave and a line containing the axis of a radial seismic energy receiver. Both the path of the reflected seismic energy wave F1-B and the axis of the radial seismic energy receiver Rr should also lie within a vertically sectioned plane, such as that shown in FIG. 5. Additionally, if the axis of the radial seismic energy receiver Rr is above or below a horizontal line, the first and second angles of emergence $\Theta_{V1}$, $\Theta_{V2}$ will be respectively less than or greater than those shown in FIG. 5.

The first and second reflected seismic energy waves F1-B, F2-B contained in the seismic survey system 500 include essentially orthogonal compression and vertical shear waves. Horizontal shear waves have been made normal to the vertically sectioned view of FIG. 5 by the horizontal rotation achieved in the embodiment of FIG. 3. The first reflected seismic energy wave F1-B includes a first compression wave P1 and a first vertical shear wave SV1. The second reflected seismic energy wave F2-B includes a second compression wave P2 and a second vertical shear wave SV2, as shown. This reflected seismic energy is received by the radial seismic energy receiver Rr and the vertical seismic energy receiver Rv at different first and second angles of emergence $\Theta_{V1}$, $\Theta_{V2}$. This situation provides another intermingled data condition that again typically complicates processing, imaging and interpreting seismic information.

Figure 6:
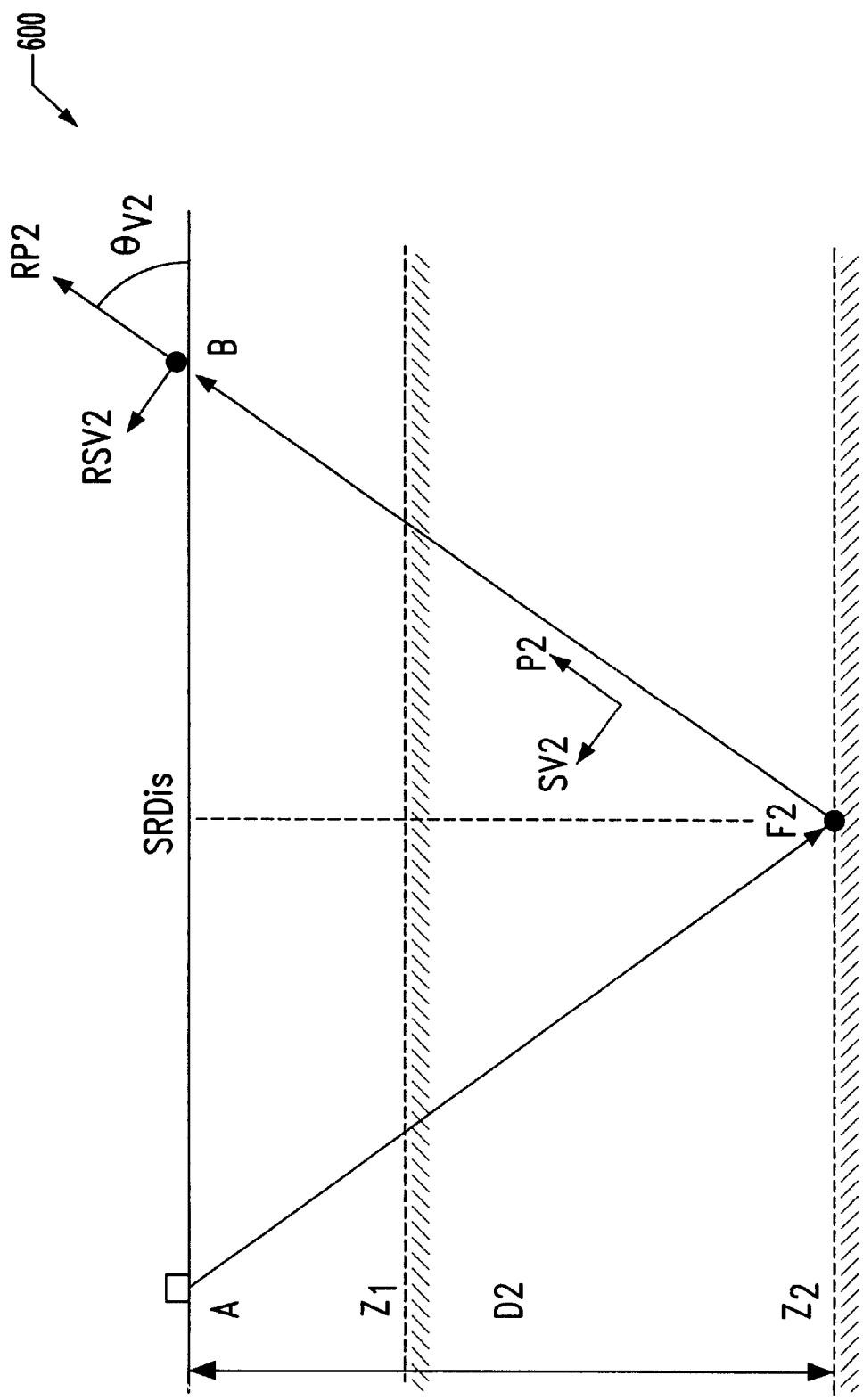
FIG. 6 illustrates a vertically sectioned plane view of an embodiment of a seismic survey system showing a transformation of the seismic survey system of FIG. 5.

Turning now to FIG. 6, illustrated is a vertically sectioned plane view of a seismic survey system 600 showing a transformation of the seismic survey system 500 of FIG. 5. The vertically sectioned plane view of FIG. 6 is taken along the straight line formed through the source-receiver station pair A-B as was shown in FIG. 3. The various subsurface geometries of FIG. 6 remain the same as in FIG. 5. Alternatively, the transformation shown in the seismic survey system 600 converts the radial and vertical coordinate orientation (radial/vertical space) of FIG. 5 to a compression and vertical shear coordinate orientation (compression/vertical shear space). Correspondingly, this second coordinate change is accomplished by another simple rotation of the receivers shown in FIG. 5.

The seismic survey system 600 includes a first receiver that is a compression seismic energy receiver RP2 and a substantially orthogonal second receiver that is a vertical shear seismic energy receiver RSV2. Both the compression seismic energy receiver RP2 and the vertical shear seismic energy receiver RSV2 have been rotated from the orientation shown in the seismic survey system 500 of FIG. 5 by an amount equal to the second angle of emergence $\Theta_{V2}$, as shown in FIG. 6. Recall that the second angle of emergence $\Theta_{V2}$ is defined as the angle between the second reflected seismic energy wave F2-B and the axis of the radial seismic energy receiver Rr of FIG. 5. In FIG. 6, the second angle of emergence $\Theta_{V2}$ is the angle between the axis of the compression seismic energy receiver RP2 and a horizontal line.

This rotation orients the compression seismic energy receiver RP2 such that it is aligned with the second angle of emergence $\Theta_{V2}$. This coordinate rotation thereby allows the compression seismic energy receiver RP2 to maximize the compressional seismic energy wave received, and the substantially orthogonal vertical shear seismic energy receiver RSV2 to maximize the vertical shear seismic energy wave received. This action thereby substantially separates the compressional wave from the vertical shear wave. Theoretically, an angle of emergence may vary between the extremes of −90° and 90° for physically oriented receivers, although a smaller range is more practically encountered due to field and equipment constraints.

From a practical perspective, the orientation of the first and second receivers to a compression/vertical shear space is more easily achieved by applying an algorithm to the data received. For the embodiment of FIG. 6 where the axis of the compression seismic energy receiver RP2 is horizontal, an algorithm in the form of a trigonometric relationship may be applied. Referring to FIG. 6, the second angle of emergence $\Theta_{V2}$ may be defined by:

$$\tan \Theta_{V2} = D2/(SRD\text{is}/2),$$

and $$\Theta_{V2} = \text{Arc tan } [D2/(SRD\text{is}/2)].$$

For this case, the second angle of emergence $\Theta_{V2}$ may vary from about 0° when the source station A and the receiver station B are widely separated to about 90° when they are in close proximity. Clearly, other methods and algorithms exist for calculating an angle of emergence and are well within the broad scope of the present invention.

As may be seen, again, in FIG. 5, an angle of emergence is a depth-dependent quantity. Therefore, aligning the compression seismic receiver RP2 with the second angle of emergence $\Theta_{V2}$ tends to focus the reflected, time-variant seismic energy, both compressional and vertical shear waves, emanating from the second subterranean feature F2 in the embodiment of FIG. 6. This particular alignment also tends to defocus the reflected, time-variant seismic energy emanating from other subsurface areas such as the first subterranean feature F1 of FIG. 5. Specifically, this capability provides a powerful tool for both separating the compressional and vertical shear waves and focusing an investigation on selected subterranean targets. Generally, this capability also provides a system and method for analyzing and interpreting an investigation of all subsurface characteristics by sweeping through all angles of emergence associated with a set of seismic data.

Figure 7:
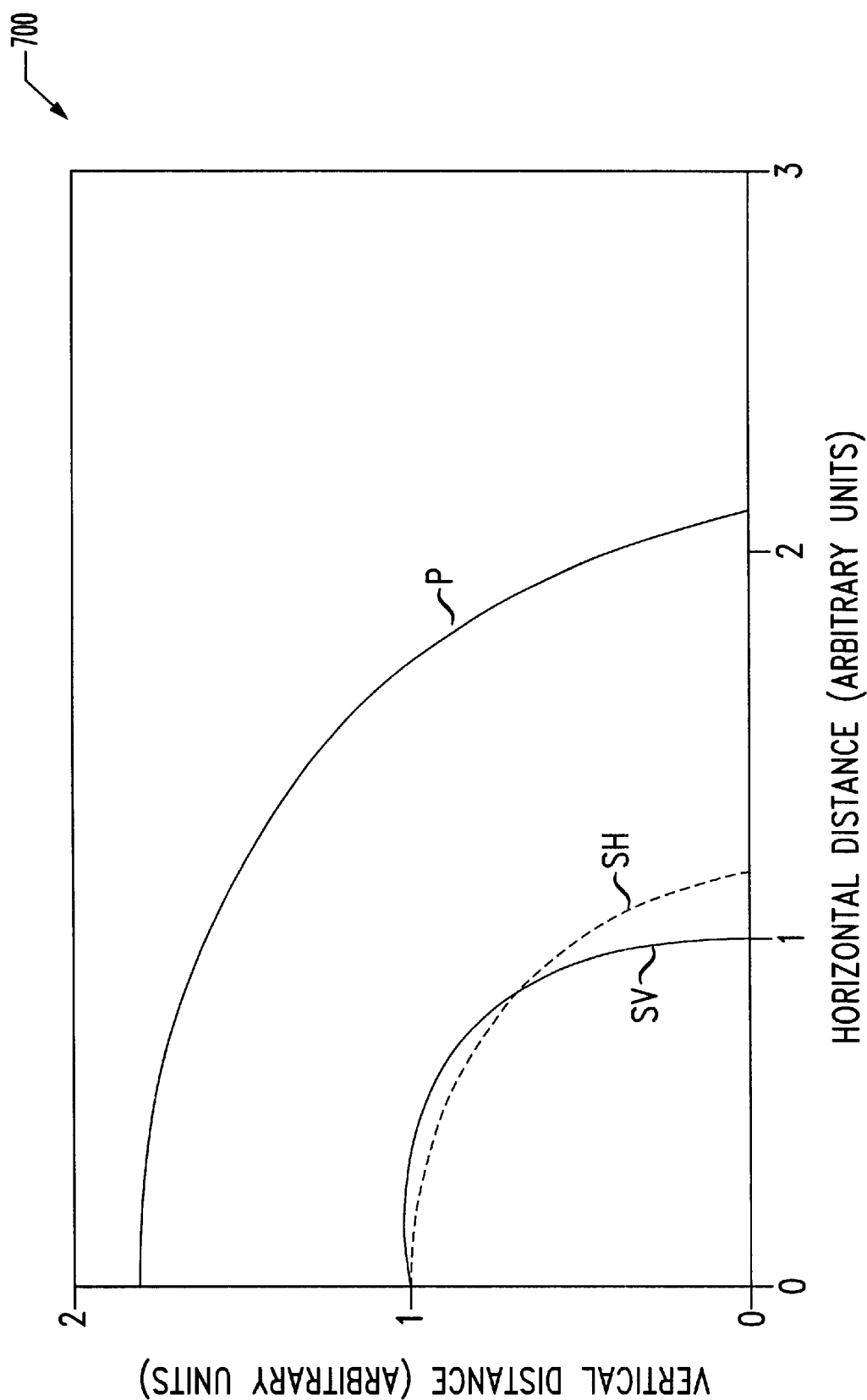
FIG. 7 illustrates a graph of wave-velocity surfaces in a transversely isotropic Earth having a vertical axis of symmetry.

Turning now to FIG. 7, illustrated is a graph of wave-velocity surfaces 700 in a transversely isotropic Earth having a vertical axis of symmetry. The wave-velocity surfaces 700 include a compressional wave-velocity surface P, a horizontal shear wave-velocity surface SH and a vertical shear wave-velocity surface SV. At vertical or normal incidence of propagating shear waves, there is no distinction between vertical and horizontal shear waves since both waves have partical motion or polarization in the horizontal plane. Distinction in amplitude and usually in traveltime as well between vertical and horizontal shear waves become apparent for non-vertical angles of incidence.

In FIG. 7, the abscissa and ordinate axes represent horizontal and vertical propagation, respectively. In an isotropic medium, the wave surface curves would be semicircles thereby demonstrating the same apparent wave velocity at all angles of incidence. For the case of vertical transverse isotropy (i.e., layering of different strata), horizontal and vertical shear velocities SH, Sv are the same at vertical incidence. However, the horizontal shear wave velocity SH is greater than the vertical shear wave velocity Sv for horizontally traveling waves, since the horizontal shear wave-velocity surface SH is seen to intersect the abscissa at a greater distance from the origin than does the vertical shear wave-velocity surface SV. Additionally, it may be noted that the horizontal and vertical shear wave-velocity surfaces SH, SV cross. FIG. 7 reveals that for small angles of incidence (near the ordinate), the vertical shear velocity Sv is greater than the horizontal shear velocity SH. At larger angles of incidence (near the abscissa) the horizontal shear velocity SH is greater that the vertical shear velocity Sv.

It may also be concluded from FIG. 7 that the splitting of traveltime between vertical and horizontal shear energies is not associated with a transverse anisotropy, such as vertical cracks or fractures. Therefore, any velocity-splitting analysis that may be applied to two-dimensional (2-D) prestack seismic data usually leads to a confusion of interpretation due to the noted differences between vertical and horizontal shear waves produced by vertical transverse isotropy. In 3-D shear wave seismic data acquisition situations, the concept of anisotropic velocity splitting is further confused by mixing of the various and variable source-receiver azimuths that are typically involved in these conventional 3-D data acquisition and recording templates.

Figure 8:
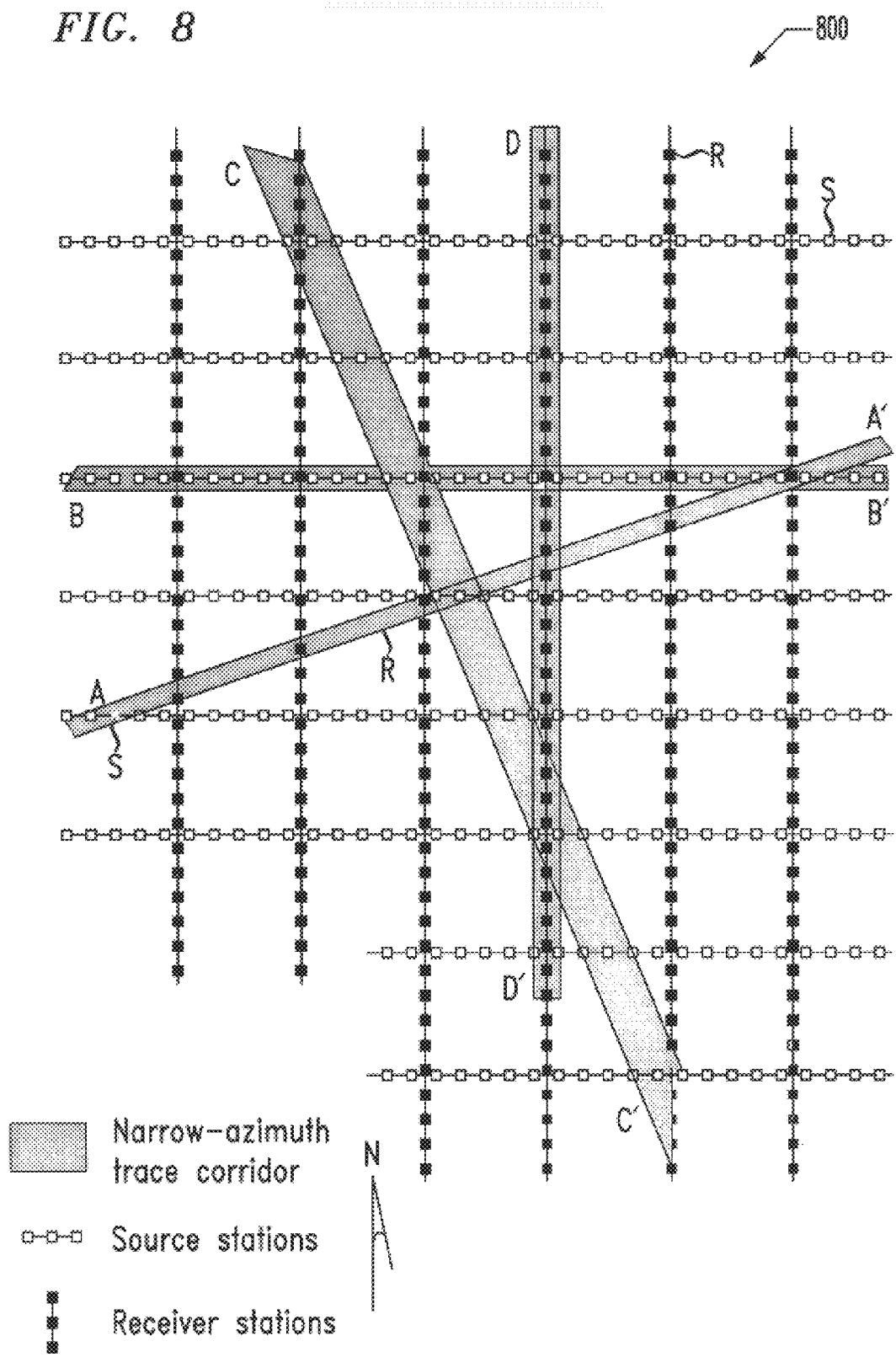
FIG. 8 illustrates a plan view of an embodiment of a seismic survey system showing seismic energy wave corridors created in arbitrary azimuth directions across an ideal volumetric or 3-D multicomponent data acquisition grid.

Turning now to FIG. 8, illustrated is a plan view of an embodiment of a seismic survey system 800 showing seismic energy wave corridors created in arbitrary azimuth directions across an ideal volumetric or 3-D multicomponent data acquisition grid, constructed according to the principles of the present invention. The seismic survey system 800 includes a collection of inline receiver stations R and a collection of crossline source stations S as shown. Each receiver station R employs three essentially orthogonal seismic energy receivers, and each source station S employs three essentially orthogonal seismic energy sources, as discussed in FIG. 1. The seismic survey system 800 also includes first, second, third and fourth seismic energy wave corridors AA', BB', CC', DD' collectively designated as seismic energy wave corridors AA'–DD'. The seismic energy wave corridors AA'–DD' represent only a few of the options with which the source and receiver stations S, R may be segregated into differing corridor widths having a narrow-azimuth that is constructed according to the principles of the present invention.

The present invention, therefore, provides a system for and a method of determining anisotropy in a stratum using scattered horizontal shear energy and vertical shear energy modes reflected from a subsurface interface. In the illustrated embodiment, each of the seismic energy wave corridors AA'–DD' focuses an investigation into a relatively narrow direction, which corresponds to a particular azimuth, thereby allowing the direction of an anisotropy to be more closely determined. Recall that the azimuth angle eH is defined as the angle between the crossline direction and a straight line formed through a source-receiver station pair, as is shown in FIG. 3.

In the illustrated embodiment, the seismic energy wave corridors AA'–DD' may be defined only after appropriate source-receiver data have been transformed into a radial and transverse orientation (radial/transverse coordinate space). This transformation orients first and second seismic energy receivers such that the first seismic energy receiver is aligned radially with a seismic energy source, and the second seismic energy receiver is aligned substantially transverse with the seismic energy source. Each of the seismic energy wave corridors AA'–DD' extends along a radial path between the seismic energy source and the first seismic energy receiver chosen in each of the seismic energy wave corridors AA'–DD'. Then, the seismic data received by the first and second seismic receivers within a corridor includes vertical and horizontal shear components, respectively. This action separates vertical and horizontal shear component data.

Additionally, this embodiment also employs a compression and vertical shear coordinate orientation (compression/vertical shear space) as a function of an angle of emergence $\Theta_V$, which further separates the compressional and vertical shear energies as discussed in FIG. 6. This orientation aligns the first seismic energy receiver substantially perpendicular to the reflected seismic energy wave, which defines the angle of emergence $\Theta_V$, to thereby maximize the vertical shear energy received by the first seismic energy receiver. The first seismic energy receiver is also oriented in a vertical plane containing the seismic energy source and the second seismic energy receiver is oriented in a plane substantially perpendicular to this vertical plane. A third seismic energy receiver is employed to receive compressional energy of the reflected seismic energy wave.

In the illustrated embodiment, an algorithm is employed that manipulates the initial data to mathematically orient the first, second and third seismic energy receivers with the reflected seismic energy wave, as described above. The computer employed in the recording vehicle 105 of FIG. 1 or another computer system may be configured to use the algorithm to manipulate the initial data to orient the first, second and third seismic energy receivers. Of course, physically orienting the first, second and third seismic energy receivers to receive the reflected seismic energy wave in the manner stated above is also well within the broad scope of the present invention. Additionally, a plurality of receiver stations having a plurality of seismic energy receivers are typically employed within a seismic energy wave corridor.

Within any seismic energy wave corridor (e.g., the first seismic energy wave corridor AA') a corridor azimuth $\Theta_{HC}$ connecting an arbitrary source station S and an arbitrary receiver station R may be described by:

$$\Theta_{HC} = \Theta_H \pm \Delta\Theta_H.$$

The azimuth angle $\Theta_H$ was defined earlier, and $\Delta\Theta_H$ is the corridor deviation around the azimuth angle $\Theta_H$ allowed for the selected seismic energy wave corridor. Therefore, the corridor deviation $\Delta\Theta_H$ defines a corridor width W of the selected seismic energy wave corridor, which is constant for the corridor embodiments shown in FIG. 8. The corridor width W defines the plurality of receiver stations for a chosen source station that may be allowed to contribute to the trace gathers for the selected seismic energy wave corridor.

As described in the illustrated embodiment, the application of seismic energy wave corridors allows an appropriate separation of vertical and horizontal seismic energy waves, both from one another and from compressional energy waves. This separation allows an enhanced determination of first-order variations in the velocities of vertical and horizontal shear waves due to anisotropy in strata. Application of the seismic energy wave corridor also allows the extent of and changes in characteristic for a particular anisotropy as a function of azimuthal direction to be more clearly ascertained.

Figure 9:
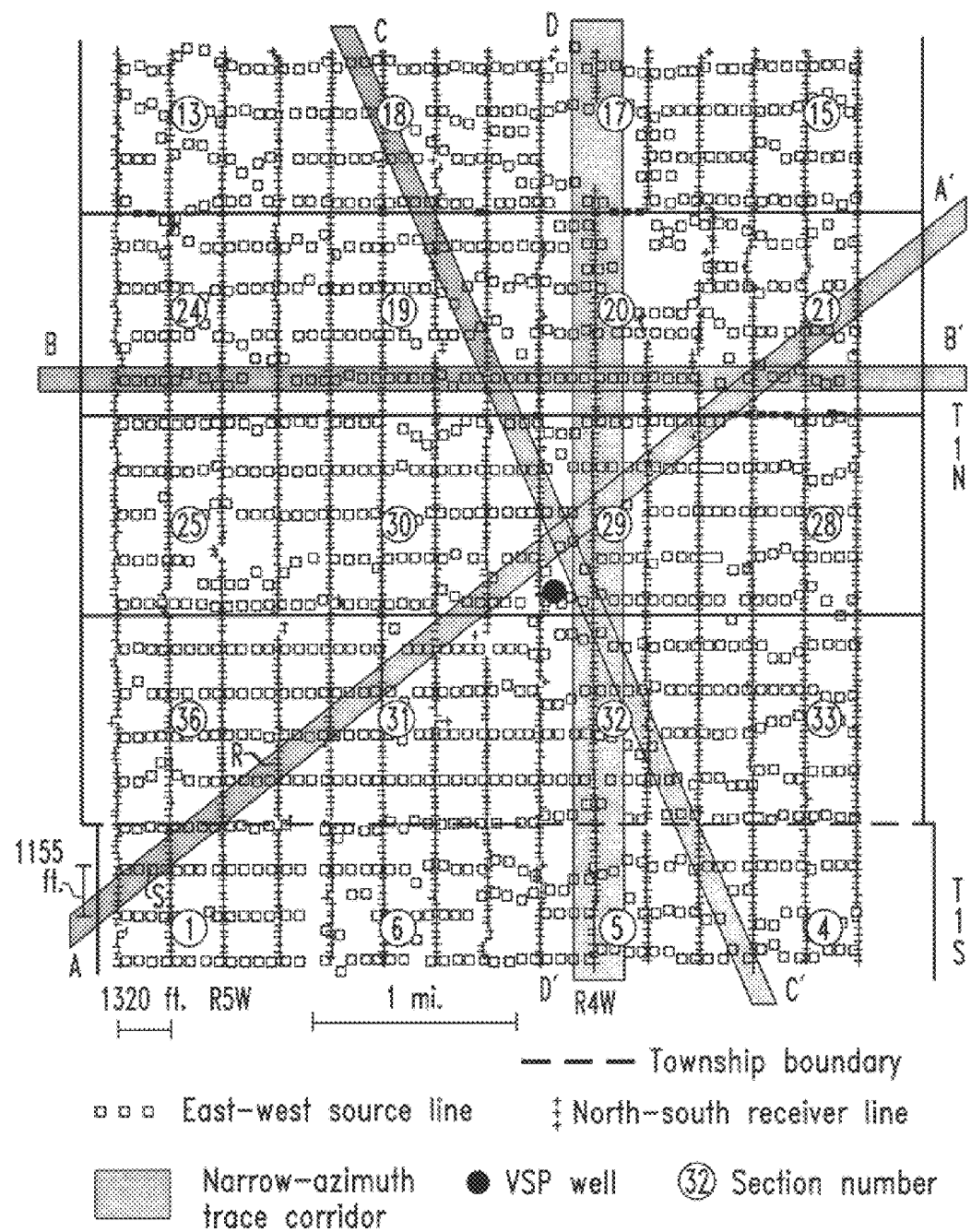
FIG. 9 illustrates a plan view of an embodiment of a seismic survey system showing seismic energy wave corridors created in arbitrary azimuth directions across an actual 3-D multicomponent data acquisition grid.

Turning now to FIG. 9, illustrated is a plan view of an embodiment of a seismic survey system 900 showing seismic energy wave corridors created in arbitrary azimuth directions across an actual 3-D multicomponent data acquisition grid. As in FIG. 8, the seismic survey system 900 includes a collection of inline receiver stations R and a collection of crossline source stations S as shown. Each receiver station typically employs three essentially orthogonal seismic energy receivers, and each source station typically employs three essentially orthogonal seismic energy sources, as discussed in FIG. 1. The seismic survey system 900 also includes first, second, third and fourth seismic energy wave corridors AA', BB', CC', DD' collectively designated as seismic energy wave corridors AA'–DD'. The seismic energy wave corridors AA'DD' again represent only a few of the options with which the source and receiver stations S, R may be segregated into differing corridor widths having a narrow-azimuth that is constructed according to the principles of the present invention.

The seismic survey system 900 differs from the ideal 3-D multicomponent data acquisition grid of the seismic survey system 800 of FIG. 8 in that some source stations are omitted due to permitting restrictions and other source stations are offset due to surface constraints. The seismic survey system 900 illustrates that even in such real-world situations there are still a sufficient number of source and receiver stations within arbitrary narrow-azimuth seismic energy wave corridors to allow a sufficiently high-fold trace gather to be constructed. This will allow the creation of a sufficient signal-to-noise ratio needed for accurate shear wave analysis and the enhanced detection of anisotropic strata.

Figure 10A:
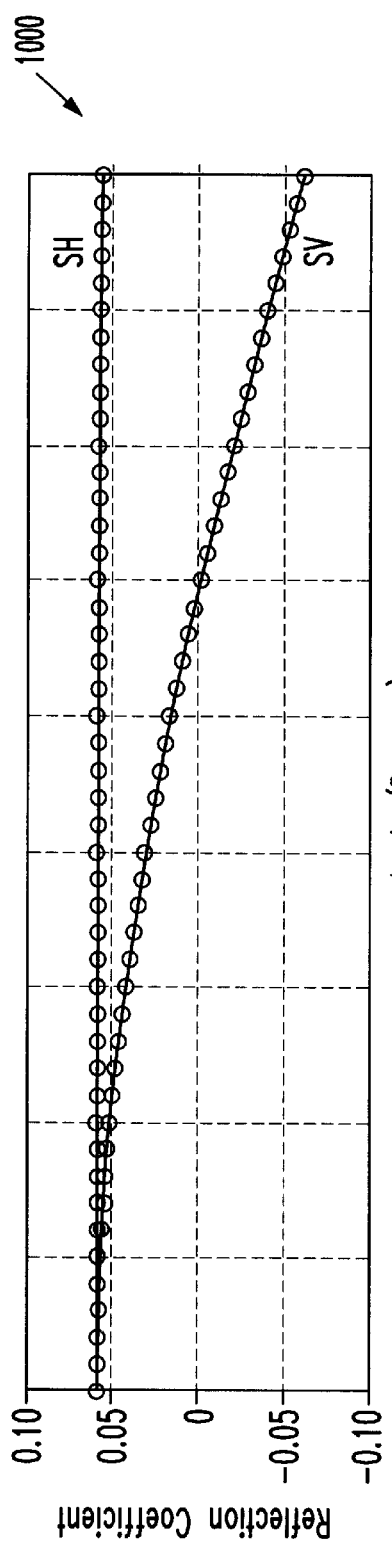
FIGS. 10A and 10B illustrate reflection coefficient graphs of horizontal and vertical shear modes at subsurface limestone-sandstone interfaces.
Figure 10B:
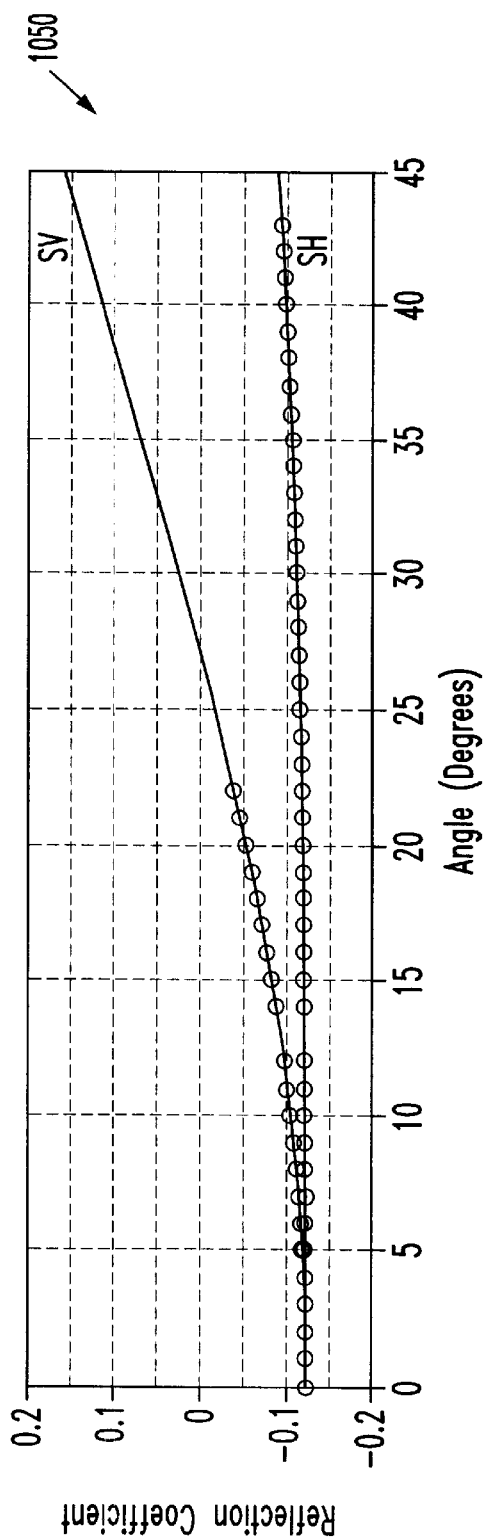

Turning now to FIGS. 10A and 10B, illustrated are reflection coefficient graphs 1000 and 1050 of horizontal and vertical shear modes at subsurface limestone-sandstone interfaces. The reflection coefficient graph 1000 is representative of an average-porosity sandstone overlaying an average-porosity limestone. The reflection coefficient graph 1050 is representative of a low-porosity limestone overlaying a high-porosity sandstone. Horizontal and vertical shear mode curves SH, Sv of the reflection coefficient graphs 1000, 1050 are functions of a change in bulk density and shear wave velocity across the reflecting interface.

It may also be noted that there are dramatic differences between the horizontal and vertical shear mode curves $S_H$, $S_V$ as a function of an angle of incidence of a respective shear wave. A key feature of these curves is that the horizontal shear mode $S_H$ is seen to have a minimal change in reflection coefficient over a wide range of angles of incidence. Although the vertical shear mode curve $S_V$ coincides with the horizontal shear mode curve $S_H$ at normal incidence (zero degrees), the reflection coefficient of the vertical shear mode curve $S_V$ is seen to deviate from the horizontal shear mode curve $S_H$ as the angle of incidence increases.

For the reflection coefficient graph 1000 (average-porosity sandstone overlaying average-porosity limestone) the reflection coefficient of the vertical shear mode curve $S_V$ is seen to become more negative with an increase in the angle of incidence. Alternatively, for the reflection coefficient graph 1050 (low-porosity limestone overlaying high-porosity sandstone) the vertical shear mode curve $S_V$ is seen to become more positive with an increase in the angle of incidence. Recognition of this offset (i.e., angle of incidence) characteristic, as well as the application of seismic energy wave corridors of appropriate azimuth for interfaces between different types of strata allows further characterization for the detection of an anisotropy such as a fractured reservoir medium.

Figure 11:
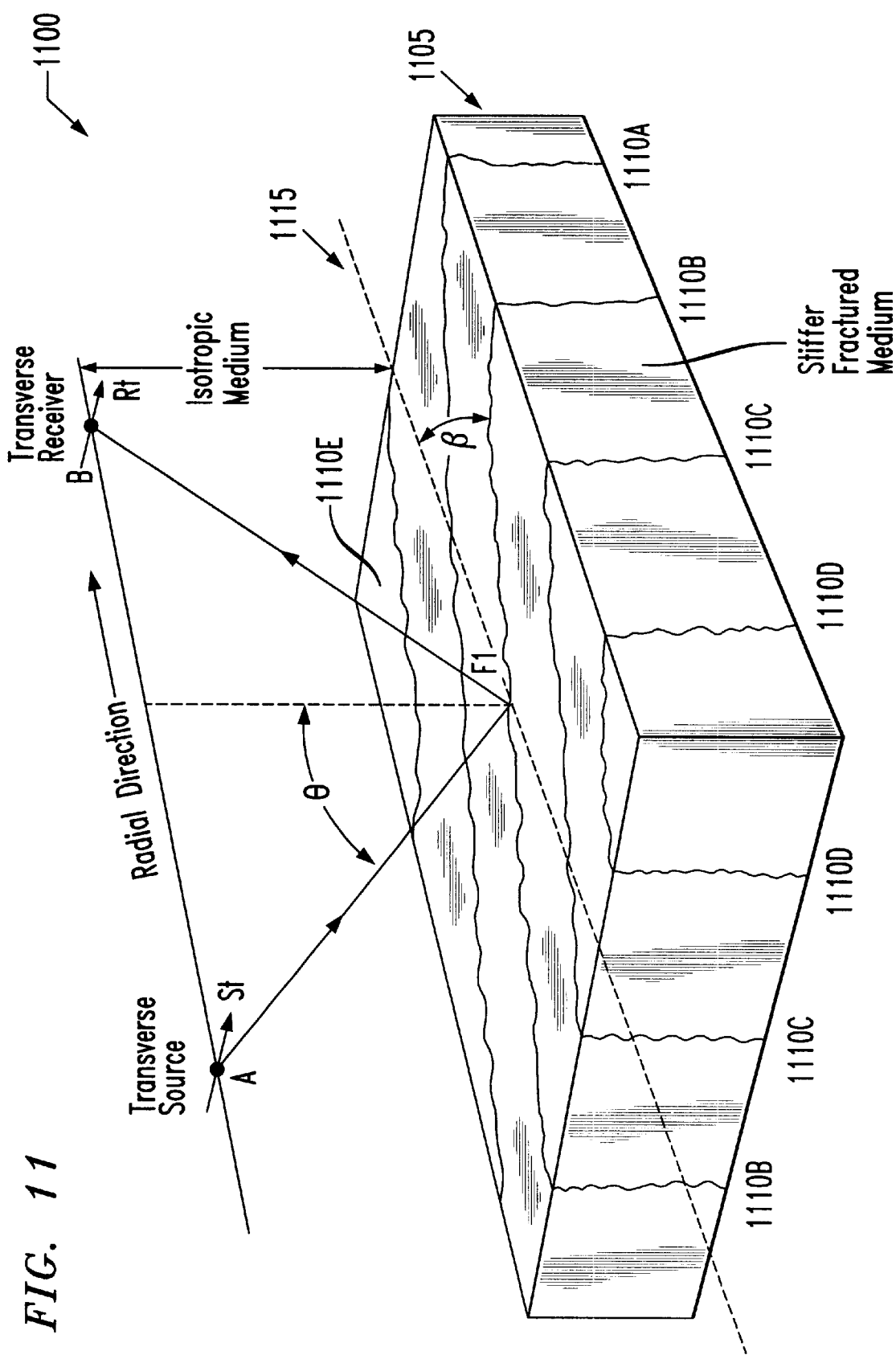
FIG. 11 illustrates a perspective view showing an embodiment of a seismic energy wave corridor extending across a vertically fractured stratum that is constructed according to the principles of the present invention.

Turning now to FIG. 11, illustrated is a perspective view 1100 showing an embodiment of a seismic energy wave corridor extending across a vertically fractured stratum that is constructed according to the principles of the present invention. The perspective view 1100 includes a fractured medium 1105 having first, second, third, fourth and fifth essentially vertical fractures 1110A, 1110B, 1110C, 1110D, 1110E collectively referred to as the fractures 1110A–E. In this embodiment, the fractured medium 1105 is "stiffer" than the strata above it, meaning that the fractured medium 1105 has a larger acoustic impedance than its overlying strata. Of course, the reverse may also generally be true.

The perspective view 1100 also includes a seismic energy wave corridor centerline 1115, which forms a fracture reference angle $\beta$ with the fractures 1110A–E of this embodiment. The perspective view 1100 further includes a seismic source station A having a transverse source St, a seismic receiver station B having a transverse receiver Rt, a subterranean feature F1 and a wavepath A-F1-B having an angle of incidence $\Phi$. Although not shown, radial sources and receivers may also be included in the seismic energy wave corridor, as appropriate.

The fracture reference angle $\beta$ may be varied by using a seismic energy wave corridor having a different azimuth angle from the one shown in FIG. 11. By using seismic data from a collection of seismic energy wave corridors having different azimuth angles and measuring the amplitudes associated with a particular subsurface event, an amplitude vs. azimuth (AVA) behavior for horizontal and vertical shear modes may be advantageously employed to delineate subsurface anisotropies. AVA analysis is particularly useful for characterizing fractured media or strata. AVA reflection behavior for horizontal and vertical shear modes illuminating a fractured target, such as the fractured medium 1105, are shown in FIG. 12 below.

Figure 12:
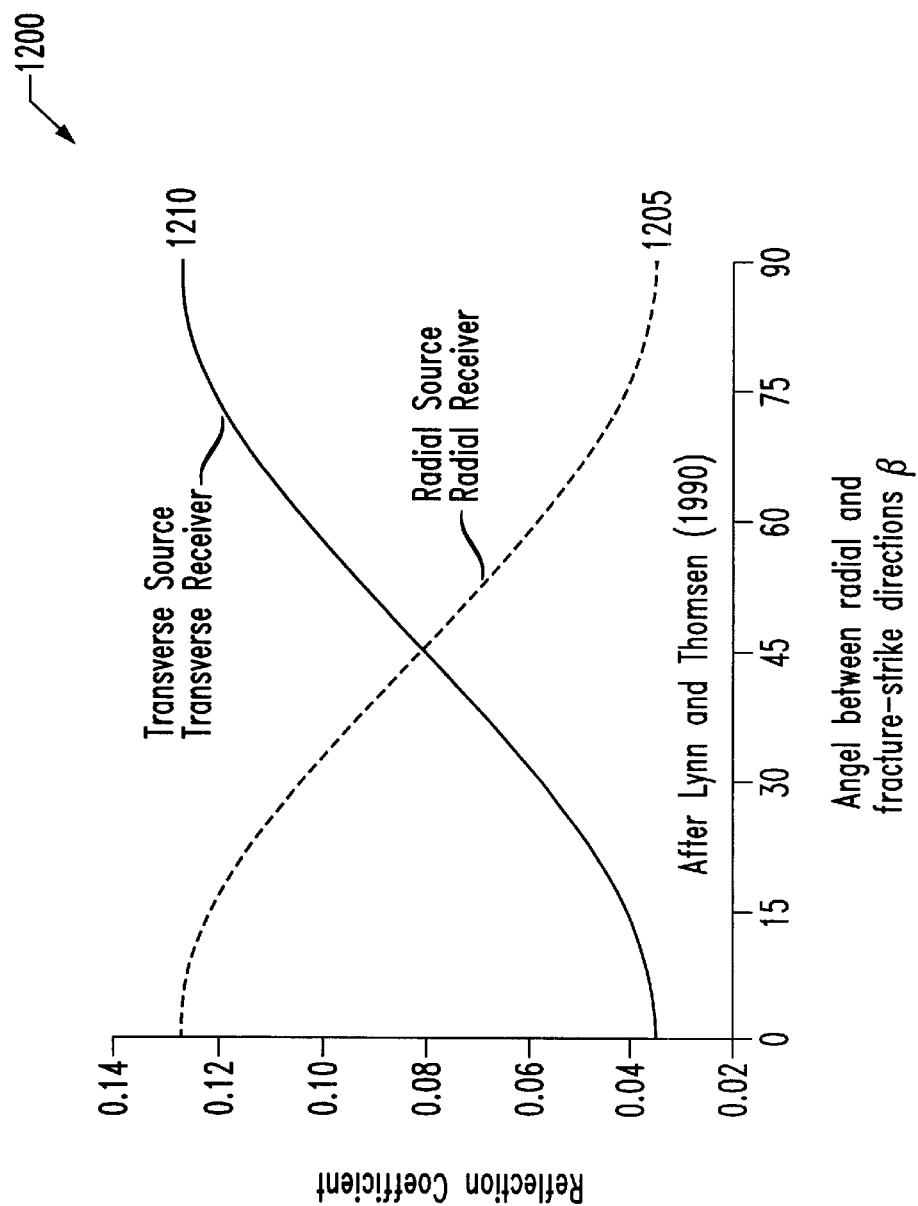
FIG. 12 illustrates a reflection coefficient graph for radial and transverse source-receiver pairs showing reflection behavior for horizontal and vertical shear modes illuminating a fractured strata at normal incidence.

Turning now to FIG. 12, illustrated is a reflection coefficient graph 1200 for radial and transverse source-receiver pairs showing reflection behavior for horizontal and vertical shear modes illuminating a fractured strata at normal incidence. The reflection coefficient graph 1200 includes a first reflection coefficient curve 1205 and a second reflection coefficient curve 1210. The first reflection coefficient curve 1205 indicates an AVA reflection behavior for a radial source-receiver pair as a function of the fracture reference angle β. Similarly, the second reflection coefficient curve 1210 indicates an AVA reflection behavior for a transverse source-receiver pair as a function of the fracture reference angle β.

Vertical shear mode energy is enhanced in the radial source-receiver pair associated with the first reflection coefficient curve 1205, and horizontal shear mode energy is enhanced in the transverse source-receiver pair associated with the second reflection coefficient curve 1210. These two curves show that the AVA reflection amplitudes of the vertical shear mode and the horizontal shear mode are a maximum when they are oriented or polarized in a direction that aligns with the plane of a fracture (i.e., fracture strike). Conversely, the reflection amplitudes of the vertical shear mode and the horizontal shear mode are a minimum when they are oriented in a direction that is perpendicular to the plane of fracture. This characteristic allows a fracture strike to be identified from a collection of seismic energy wave corridors by maximizing or minimizing the shear mode energies, as appropriate.

Figure 13:
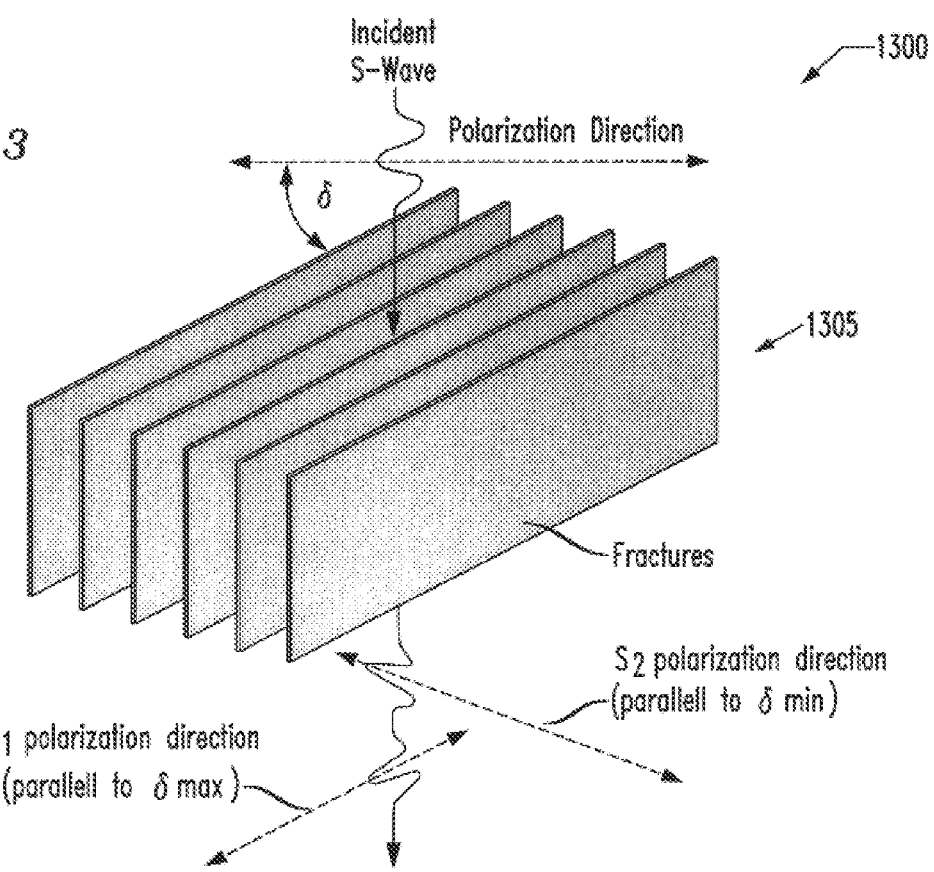
FIG. 13 illustrates an isometric view showing a collection of vertical fracture planes segregating an incident first order shear wave into second order components.

Turning now to FIG. 13, illustrated is an isometric view 1300 showing a collection of vertical fracture planes segregating an incident first order shear wave into second order components. The isometric view 1300 includes a collection of fractures 1305 and an incident first-order shear wave S-WAVE having a polarization angle a with respect to a fracture strike, as shown. The isometric view 1300 also includes a first second-order shear wave S1 and a second second-order shear wave S2. The collection of fractures 1305 causes the illuminating incident first order shear wave S-WAVE to segregate or split into the first and second second-order shear waves S1, S2.

The first and second second-order shear waves S1, S2 continue to propagate in the same direction as the incident first order shear wave S-WAVE. However, their polarization changes such that the first second-order shear wave S1 is polarized parallel to the plane of the collection of fractures 1305, and the second second-order shear wave S2 is polarized perpendicular to the plane of the collection of fractures 1305. The direction of maximum horizontal stress (and typically maximum material strength) is parallel to the plane of the collection of fractures 1305. Correspondingly, the direction of minimum horizontal stress (and typically minimum material strength) is perpendicular the plane of the collection of fractures 1305. This anisotropy contributes to making the first second-order shear wave S1 (the fast component) propagate with a faster velocity than the second second-order shear wave S2 (the slow component). When properly discerned in the analysis of seismic data, these second order shear wave effects provide a powerful analytical tool for determining the presence of vertically fractured media and its fracture strike direction.

Figure 14:
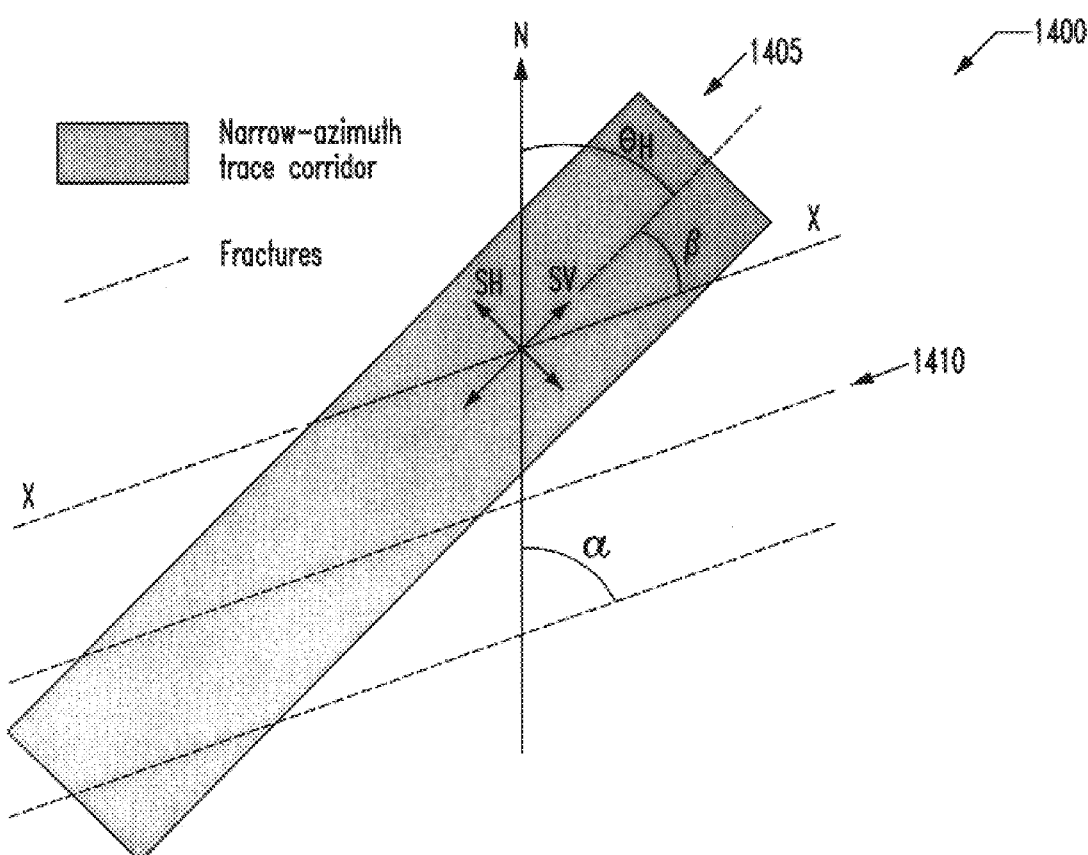
FIG. 14 illustrates a plan view showing horizontal and vertical shear modes in a seismic energy wave corridor illuminating a collection of vertical fractures.

Turning now to FIG. 14, illustrated is a plan view 1400 showing horizontal and vertical shear modes in a seismic energy wave corridor illuminating a collection of vertical fractures. The plan view 1400 includes a seismic energy wave corridor 1405 having an azimuth angle $\Theta_H$, a collection of vertical fractures 1410 having a fracture strike angle α and a fracture reference angle β along with illuminating vertical and horizontal shear modes SV, SH.

Recall from FIG. 4 that the first data set Sr;Rr and the fourth data set St;Rt are good approximations of the vertical and horizontal shear modes SV, SH, respectively. They may be considered to be a first order segregation of shear wave velocities whether the propagation medium consists of isotropic layers or contains one or more anisotropic layers. For the case of anisotropic layers, a second order segregation of shear wave velocities also occurs as discussed in FIG. 13. However, second order horizontal and vertical shear modes may typically be analyzed accurately using shear wave data that have been segregated into their first order horizontal and vertical shear mode differences. Such a second order velocity segregation is depicted in FIG. 14.

In radial/transverse coordinate space, two horizontal sources (the radial and transverse seismic sources Sr, St) and two horizontal receivers (the radial and transverse seismic receivers Rr, Rt) within each seismic energy wave corridor allow the creation of a 2×2 data matrix. The 2×2 data matrix employs the first, second third and fourth data sets Sr;Rr, Sr;Rt, St;Rr, St;Rt as shown below:

$$\begin{pmatrix} St;Rt & St;Rr \\ Sr;Rt & Sr;Rr \end{pmatrix}.$$

Only the first data set Sr;Rr and the fourth data set St;Rt are shown in FIG. 14 as the vertical and horizontal shear modes SV, SH, respectively.

The second order shear mode segregation created by the anisotropy of the collection of vertical fractures 1410 reorients the vertical and horizontal shear modes SV, SH (matrix terms Sr;Rr, St;Rt) so that their second order shear mode components are parallel and perpendicular (as discussed in FIG. 13) to the fracture planes of FIG. 14 (not shown). This new orientation angle may be determined by systematically rotating all four terms of the 2×2 data matrix above in sequential angular increments to determine the azimuth angle that maximizes the diagonal terms of the matrix. Diagonalizing the 2×2 data matrix in this manner ensures that the two data vectors that comprise the matrix are independent. This attribute is a fundamental requirement for the two anisotropy-aligned shear wave modes (second order components) to be uncoupled. The angle of rotation that maximizes the diagonal terms of the 2×2 data matrix above defines the orientation of the major axes of anisotropy, or the fracture strike direction in this embodiment.

Figure 15:
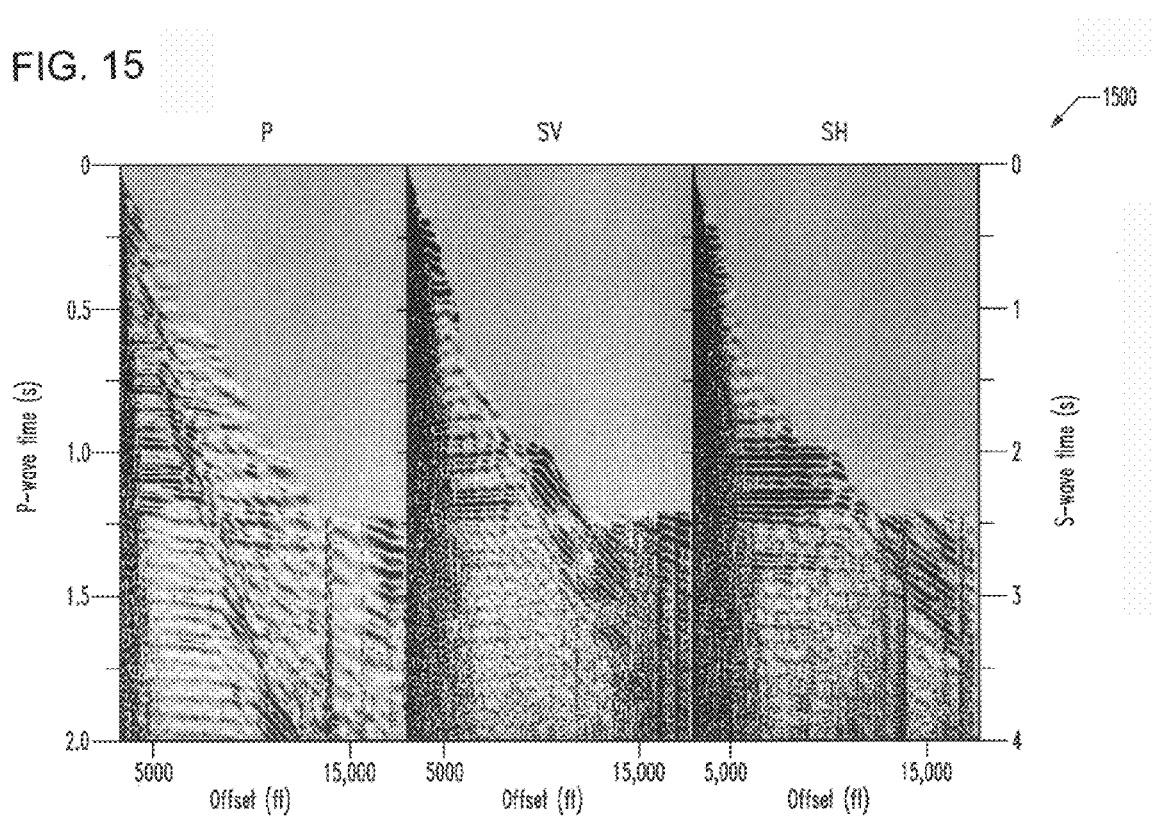
FIG. 15 illustrates a time/offset survey data plot using multiple nine-component, three-dimensional (9C3D) source-receiver stations within a seismic energy wave corridor consisting of super gathers of prestack data that illuminate a fractured target area.

Turning now to FIG. 15, illustrated is a time/offset survey data plot 1500 using multiple nine-component, three-dimensional (9C3D) source-receiver stations within a seismic energy wave corridor consisting of super gathers of prestack data that illuminate a fractured target area. The time/offset survey data plot 1500 employs a radial/transverse coordinate space utilizing the horizontal shear mode SH (matrix element St;Rt) and the vertical shear mode SV (matrix element Sr;Rr). A normal moveout (NMO) has been applied to flatten the horizontal shear mode SH reflection events.

It may be noted that this application overcorrects the vertical shear mode SV reflections, which is further indication that the horizontal shear mode SH has a velocity that is greater than the vertical shear mode SV, in this embodiment. A fracture target is readily definable in the panel depicting the horizontal shear mode SH as shown in FIG. 15. This definition of the fracture target was seen to be obscured in FIGS. 2 and 4.

In summary, an initial transformation of seismic data into a radial/transverse coordinate space, especially along a seismic energy wave corridor, may be advantageously accomplished to enhance the separation of vertical and horizontal shear mode energies. This transformation and separation achieves a first order effect needed in an analysis to illuminate an anisotropy. Then, the segregating of first order vertical and horizontal shear modes of a seismic energy wave into second order vertical and horizontal shear modes by the anisotropy may be more accurately discerned to provide additional attributes of the anisotropy.

Although the present invention has been described in detail, those skilled in the art should understand that they can make various changes, substitutions and alterations herein without departing from the spirit and scope of the invention in its broadest form.

What is claimed is:

1. A method of determining vertical fractures in a stratum using scattered horizontal shear and vertical shear modes, comprising:
    segregating first order horizontal and vertical shear modes of a seismic energy wave into second order horizontal and vertical shear modes;
    defining a seismic energy wave corridor along a radial path between a seismic energy source and seismic receivers; and
    gathering seismic data received by said seismic receivers within said corridor, said data including said second order horizontal and vertical shear modes.

2. The method as recited in claim 1 wherein segregating includes transforming said seismic energy wave received by said seismic receivers into radial/transverse coordinate space.

3. The method as recited in claim 2 wherein transforming includes:
    orienting a first seismic receiver with a seismic energy source along a radial path between the first seismic receiver and the seismic energy source to obtain a vertical shear component; and
    aligning a second seismic receiver substantially transverse to said radial path to obtain a horizontal shear component.

4. The method as recited in claim 3 wherein said first and second seismic energy receivers are substantially orthogonal with respect to each other and transforming further includes:
    orienting first and second seismic energy receivers such that said first seismic energy receiver is aligned substantially perpendicular to a reflected seismic energy wave having an angle of emergence to thereby maximize said vertical shear energy received by said first seismic energy receiver and said second seismic energy receiver is aligned substantially tangential to said energy wave.

5. The method as recited in claim 4 wherein said seismic energy receiver further includes a third seismic energy receiver substantially orthogonal to said first and second seismic energy receivers and orienting first and second seismic energy receivers includes aligning said third seismic energy with said reflected seismic energy wave.

6. The method as recited in claim 1 wherein transforming seismic energy includes transforming waves generated by a seismic energy source and received by a plurality of seismic receivers within said corridor into radial/transverse coordinate space.

7. The method as recited in claim 6 wherein gathering includes summing data received by said plurality of seismic receivers and dividing said plurality of seismic receivers into stacking bins.

8. The method as recited in claim 1 wherein determining includes determining an azimuth of said corridor with respect to the seismic energy source and a width of said corridor.

9. A system for determining anisotropy in a stratum using scattered horizontal shear and vertical shear modes, comprising:
    a seismic energy source;
    reflected seismic energy wave reflected from a subsurface interface and having horizontal shear energy and vertical shear energy associated therewith; and
    first and second seismic energy receivers, wherein said first seismic energy receiver is aligned radially with said seismic energy source and wherein said second seismic energy receiver is aligned substantially transverse with said seismic energy source;
    a seismic energy wave corridor extending along a radial path between said seismic energy source and said first seismic energy receiver;
    seismic data received by said first and second seismic receivers within said corridor, said data including vertical and horizontal shear components; and
    first order horizontal and vertical shear modes of a seismic energy wave segregated into second order horizontal and vertical shear modes vertical and horizontal shear component data.

10. The system as recited in claim 9 wherein said first seismic energy receiver is aligned substantially perpendicular to said reflected seismic energy wave having an angle of emergence to thereby maximize said vertical shear energy received by said first seismic energy receiver.

11. The system as recited in claim 10 wherein said first seismic energy receiver is oriented in a vertical plane containing said seismic energy source and said second seismic energy receiver is oriented in a plane substantially perpendicular to said vertical plane.

12. The system as recited in claim 10 wherein said angle of emergence is between 0° and 90°.

13. The system as recited in claim 10 wherein said first seismic energy receiver is physically oriented to receive data.

14. The system as recited in claim 10 further including:
    a third seismic receiver for receiving compressional energy of said reflected seismic energy wave;
    initial data representing reflected compressional and vertical shear energy; and
    an algorithm that manipulates said initial data to mathematically orient said first receiver and mathematically orient said third receiver with said reflected seismic energy wave.

15. The system as recited in claim 14 further including a computer configured to use said algorithm to manipulate said initial data to orient said first and third seismic energy receivers.

16. The system as recited in claim 15 further including radial coordinates, compressional coordinates, vertical coordinates and vertical shear coordinates.

17. The system as recited in claim 9 wherein said second seismic energy receiver is aligned substantially perpendicular to a plane containing said reflected seismic energy wave.

18. The system as recited in claim 9 further including a plurality of seismic receivers within said corridor.

19. The system as recited in claim 9 wherein said first and second energy receivers are orthogonal with respect to each other.

20. A method of exploring a subterranean feature with seismic energy, comprising:

generating a seismic energy wave toward a subterranean feature;

reflecting said seismic energy from said subterranean feature to produce a reflected seismic energy wave having vertical and horizontal shear energy associated therewith;

segregating first order horizontal and vertical shear modes of a seismic energy wave into second order horizontal and vertical shear modes;

determining a seismic energy wave corridor along a radial path between said seismic energy source and said seismic receiver; and gathering seismic data received by said seismic receivers within said corridor, said data including horizontal and vertical shear components.

21. The method as recited in claim 20 wherein segregating includes transforming seismic energy wave generated by a seismic energy source and received by a seismic receiver into radial/transverse coordinate space.

22. The method as recited in claim 21 wherein transforming includes:

orienting a first seismic receiver with a seismic energy source along a radial path between the first seismic receiver and the seismic energy source to obtain a vertical shear component; and aligning a second seismic receiver substantially transverse to said radial path to obtain a horizontal shear component.

23. The method as recited in claim 22 wherein said first and second seismic energy receivers are substantially orthogonal with respect to each other and transforming further includes:

orienting first and second seismic energy receivers such that said first seismic energy receiver is aligned substantially perpendicular to a reflected seismic energy wave having an angle of emergence to thereby maximize said vertical shear energy received by said first seismic energy receiver and said second seismic energy receiver is aligned substantially tangential to said energy wave.

24. The method as recited in claim 23 wherein said seismic energy receiver further includes a third seismic energy receiver substantially orthogonal to said first and second seismic energy receivers and orienting first and second seismic energy receivers includes aligning said third seismic energy with said reflected seismic energy wave.

25. The method as recited in claim 20 wherein transforming seismic energy includes transforming waves generated by a seismic energy source and received by a plurality of seismic receivers within said corridor into radial/transverse coordinate space.

26. The method as recited in claim 25 wherein gathering includes summing data received by said plurality of seismic receivers and dividing said plurality of seismic receivers into stacking bins.

27. The method as recited in claim 20 wherein determining includes determining an azimuth of said corridor with respect to the seismic energy source and a width of said corridor.

* * * * *